(12) United States Patent
Johnson et al.

(10) Patent No.: US 7,797,539 B2
(45) Date of Patent: Sep. 14, 2010

(54) RESILIENT CRYPTOGRAPHIC SCHEME

(75) Inventors: Donald B. Johnson, Manassas, VA (US); Scott A. Vanstone, Campbellville (CA)

(73) Assignee: Certicom Corporation, Mississauga, Ontario (CA)

( * ) Notice: Subject to any disclaimer, the term of this patent is extended or adjusted under 35 U.S.C. 154(b) by 1239 days.

(21) Appl. No.: 09/907,935

(22) Filed: Jul. 19, 2001

(65) Prior Publication Data

US 2002/0057797 A1    May 16, 2002

(51) Int. Cl.
*G06F 21/24* (2006.01)
*H04L 9/14* (2006.01)

(52) U.S. Cl. ................. 713/176; 713/181
(58) Field of Classification Search ............. 380/29, 380/30; 713/189
See application file for complete search history.

(56) References Cited

U.S. PATENT DOCUMENTS

| | | | | |
|---|---|---|---|---|
| 5,297,206 A | * | 3/1994 | Orton | 380/30 |
| 5,373,561 A | * | 12/1994 | Haber et al. | 713/157 |
| 5,548,648 A | * | 8/1996 | Yorke-Smith | 713/193 |
| 5,764,762 A | * | 6/1998 | Kazmierczak et al. | 705/52 |
| 5,915,024 A | * | 6/1999 | Kitaori et al. | 713/176 |
| 5,946,396 A | * | 8/1999 | Davis | 713/178 |
| 5,978,484 A | * | 11/1999 | Apperson et al. | 705/54 |
| 5,995,623 A | * | 11/1999 | Kawano et al. | 713/189 |
| 6,021,201 A | * | 2/2000 | Bakhle et al. | 713/189 |
| 6,490,353 B1 | * | 12/2002 | Tan | 380/37 |
| 7,353,386 B2 | * | 4/2008 | Sarfati et al. | 713/161 |
| 2007/0124602 A1 | * | 5/2007 | Wald et al. | 713/193 |
| 2008/0010218 A1 | * | 1/2008 | Zank | 705/75 |

FOREIGN PATENT DOCUMENTS

| | | |
|---|---|---|
| EP | 0 727 746 A | 8/1996 |
| EP | 727746 A2 * | 8/1996 |
| EP | 0 801 478 A | 10/1997 |
| EP | 801478 A2 * | 10/1997 |

OTHER PUBLICATIONS

Menezes; A.J; Oorschot Van; P.C.; Vanstone; S.A. : "Handbook Of Applied Cryptography." 1997, CRC Press, Boac Raton, Florida; XP002137207ISBN: 0-8493-8523-7 pp. 283-294, 425-426, 507-508.

* cited by examiner

*Primary Examiner*—Christopher A Revak
(74) *Attorney, Agent, or Firm*—Novak Druce & Quigg LLP

(57) ABSTRACT

A method for communicating information between at least a pair of correspondents, the method comprising the steps of each of the correspondents selecting a plurality of cryptographic algorithms known to each of the correspondents. One of the correspondents applies the algorithms in a predetermined manner to a message for producing a set of processed information. The set of processed information is transmitted to the other correspondent. The other correspondent applies complimentary operations of the cryptographic schemes in accordance with the predetermined manner for deriving information related to the message from the processed information.

19 Claims, 3 Drawing Sheets

50

RESILIENT CRYPTOGRAPHIC SCHEME

This invention relates to cryptographic schemes, and particularly, to a method for implementing a cryptographic scheme that is resistant to catastrophic failure.

BACKGROUND OF THE INVENTION

Cryptographic schemes allow correspondents to send messages in secret or hidden form, so that only those people authorized to receive the message will be able to read it. Cryptographic schemes are generally based on one of two systems, namely, a private key system or a public key system. In a private key system, the method for data encryption requires the parties who communicate to share a common key. Private key systems have the disadvantage that the users of the scheme have to somehow exchange a common key in a secure fashion before any data is encrypted. This key should also be changed relatively often for other cryptographic reasons.

Whereas private key cryptography utilizes a single key for both encryption and decryption, public key cryptography utilizes several different keys for encryption and decryption. The encryption keys can thus be made public with the decryption keys maintained secret.

Public key systems have been deployed in specific systems. For example, the RSA scheme is a deployment of the general public key scheme. Similarly, discrete log systems and elliptic curve systems are other deployments of the general public key system. Public key systems may also be used to sign messages so that a recipient may verify the origin of the message using a public key of the sender.

Obviously, in a cryptographic system there is the threat of an attacker obtaining or deducing the key, the private key in the case of public key systems, and thereby compromising communication between a pair of users. The lucky recovery by an attacker of one or two keys is not in itself a serious problem, as a particular key can be revoked and disallowed for further use. However, a serious threat to the future resiliency of a particular cryptographic scheme is the ability of an attacker to devise a systematic method whereby a large number, or even all keys, for that system can be recovered. The resistance to such systematic attacks will depend on the underlying system used, but one factor is the key size.

For example, in the RSA scheme, keys of 512 bits or less are extremely vulnerable to a variety of attacks.

Corporate-wide deployment of a specific scheme is normally based on an assumption that the scheme will be secure at least for some time beyond the near future. However, just as cryptographic systems are advancing in their security, so are attackers advancing in devising new attacks against these systems. For example, in the future there may be an advance on the special purpose attack method which attacks a subset of keys for a particular scheme or there may be an advance in a general purpose attack method which attacks essentially all keys. The response to a special purpose attack on a keyed algorithm is to generally exclude weak cases, i.e., keys with a certain weak property. Similarly, a general-purpose attack can be addressed by increasing the primary security parameters to where attacks are again infeasible.

Therefore, there is a need for a cryptographic scheme that is more resilient than the schemes presently in use.

SUMMARY OF THE INVENTION

Accordingly, it is an object of this invention to provide a more resilient cryptographic scheme that is more resistant to specific or general purpose attacks than current schemes.

In accordance with this invention there is provided a method for communicating information between at least first and a second correspondent, the method comprising the steps of: selecting a plurality of cryptographic algorithms known to each of the correspondents;

the first correspondents applying the algorithms in a predetermined manner to a message to produce processed information;

transmitting this processed information to the other correspondent; and the second correspondent applying complimentary operations of said cryptographic schemes in accordance with the predetermined manner to derive information related to the message from the processed information.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
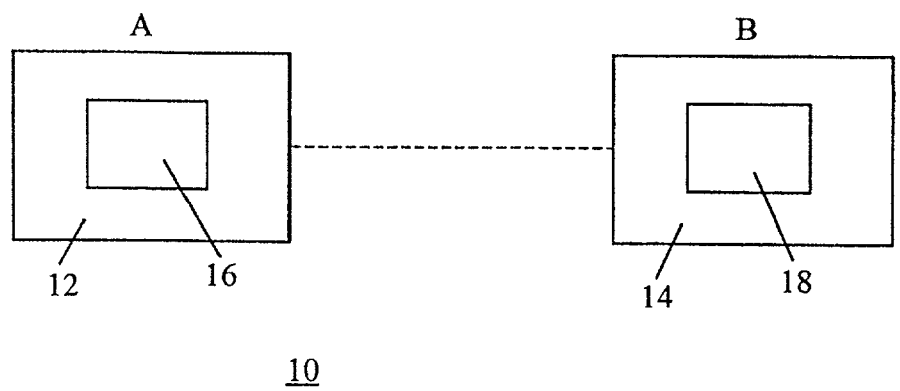
FIG. 1 is schematic diagram of a communication system.

Referring to FIG. 1, a communication system having at least a pair of corespondents is shown generally by numeral 10. It is assumed that the correspondents 12 and 14 incorporate cryptographic units 16 and 18 respectively. For convenience, the first correspondent will be referred to as a sender and the second correspondent will be referred to as a receiver. Generally, a plain text message is processed by the encryption unit of the sender and transmitted as cyphertext along a communication channel to the receiver where the encryption message is decrypted by the cryptographic unit 18 to recover the original message.

Figure 2:
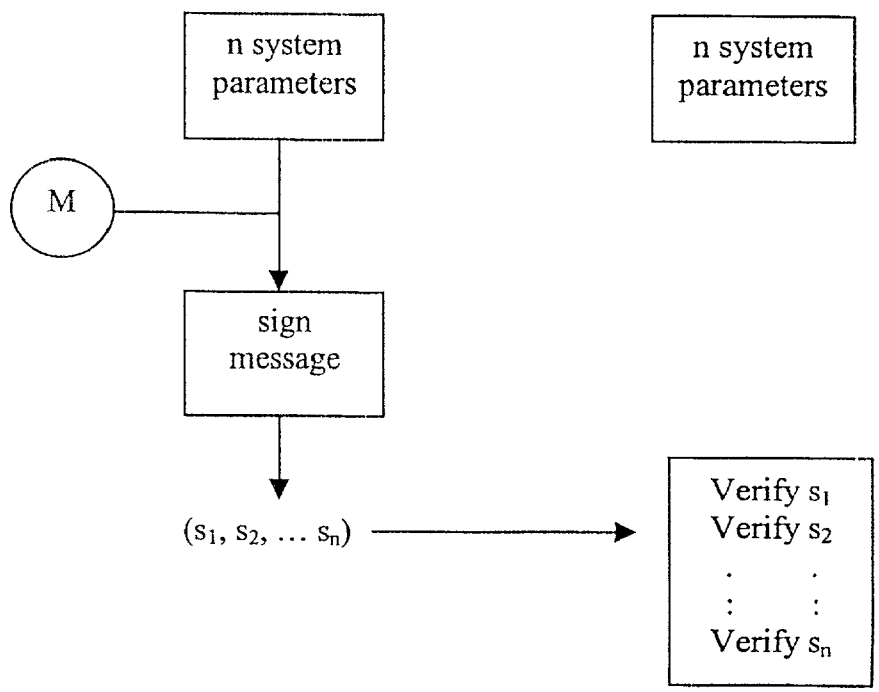
FIG. 2 is a flow diagram showing a signature scheme according to an embodiment of the present invention.

Referring to FIG. 2, a signature scheme according to an embodiment of the invention is shown generally by numeral 30. In this embodiment, the correspondents select several signature schemes such as RSA, DSA and ECDSA from a plurality of signature schemes. Using these three signature schemes, the sender processes the information to be signed to produce three sets of processed information in the form of three independent signatures ($S_1$, $S_2$, $S_3$). These combine to form a multiple signature. The individual signatures are then transmitted to the recipient who then verifies the signatures using the corresponding verification part of the algorithm.

Thus, it may be seen that a break in any one or two algorithms will not affect the validity of the remaining signatures. Therefore, if all three signatures cannot be verified, the recipient is aware that at least one of the sets of processed information may have been interfered with by a third party. In order for the third party to effectively interfere with a signature using such a scheme, the third party has to break all of the encryption algorithms used. Although the third party may be able to uncover information related to the original message, it is of little use without breaking the remaining algorithms.

Although the present embodiment is described as selecting three signature schemes, any plurality of schemes may be used as required by a particular implementation. Further, effective signature schemes other than RSA, DSA, and ECDSA may also be used.

Figure 3:
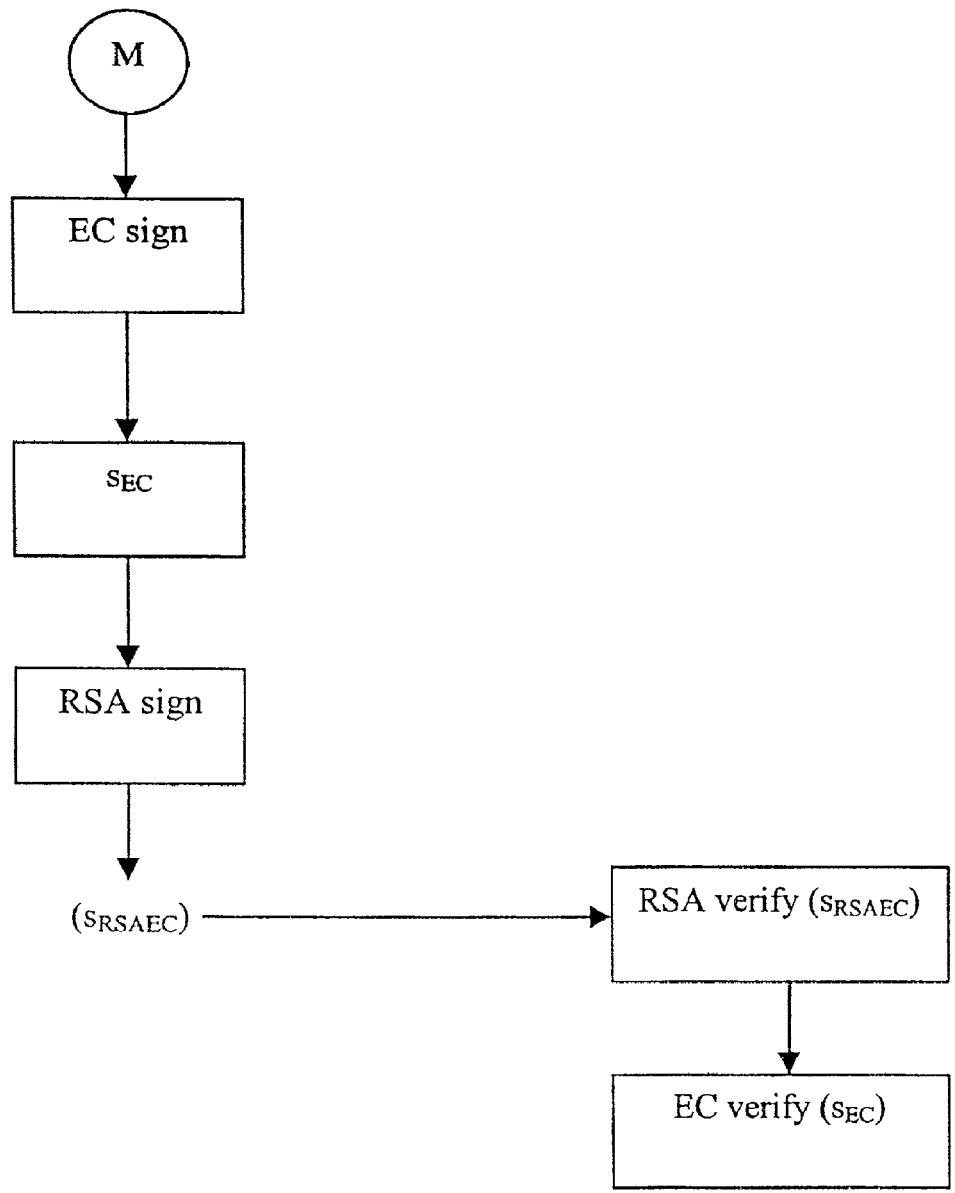
FIG. 3 is a flow diagram showing a further signature scheme according to an embodiment of the invention.

An alternate embodiment is illustrated in FIG. 3 by the numeral 40. The sender uses ECDSA for generating a set of processed information in the form of an EC signature. The sender subsequently inputs the EC signature to an RSA signature generation function (with message recovery) to generate a further set of processed information in the form of an RSA signed EC signature. The RSA signed EC signature is then transmitted to the recipient.

The recipient initially recovers the EC signature from the RSA sign EC signature. The recipient then recovers the original message from the EC signature and verifies the identity of the origin of the message. The EC signature thus provides redundancy for preventing manipulation attacks on the RSA signature. As in the previous embodiment, in order for the third party to effectively interfere with a signature using such a scheme, the third party has to break all of the encryption algorithms used. However, using the present embodiment will prevent the third party from uncovering information related to the original message unless all of the encryption algorithms are broken.

Furthermore, using alternate signature schemes or the same schemes in a different order is possible.

Figure 4:
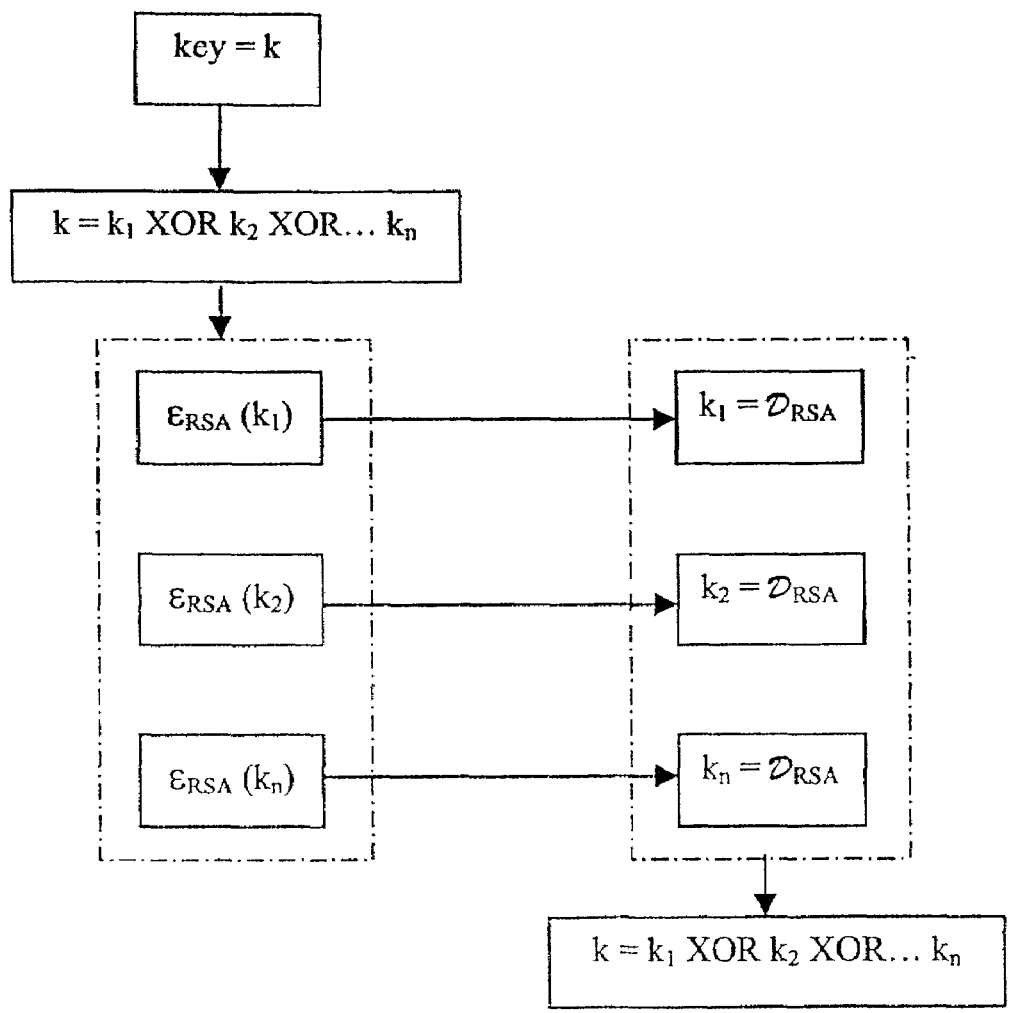
FIG. 4 is a flow diagram of key agreement scheme according to an embodiment of the invention.

Yet an alternate embodiment is illustrated in FIG. 4, referred to generally by the numeral 50. In the present embodiment, the correspondents wish to communicate with a symmetric key. In general, public key schemes are used to assign symmetric keys transmitted between correspondents. The symmetric keys are then used by the correspondents to encrypt and decrypt messages transmitted between the correspondents. The symmetric key is then divided in to a plurality of parts. In this example, the key is divided into three parts and each of the parts is encrypted a respective cryptographic algorithm. The first part is encrypted RSA, the second part with a discrete log (DL) encryption, and the third with EC encryption. The three parts are then transmitted to the recipient who recovers all three parts by applying the corresponding decryption operation on the respective part. Each of the parts is then XOR'd together to derive the symmetric key. A key confirmation algorithm may then be used to ensure that the recovered symmetric key is correct. A break in one or two of the algorithms will not allow an adversary to recover the value of the symmetric key.

For key agreement, the sender composes three shared secrets from RSA, DL and EC key agreement schemes (respectively) all three of which are then input to a symmetric key derivation function. Alternatively, the sender may derive three symmetric key parts independently from an RSA shared secret, a DL shared secret, and an EC shared secret.

In a message authentication code (MAC), the correspondents can use different MAC algorithms such as DES-CBC-MAC and HMAC and then follow one of those signature models described above. For data encryption, the correspondents supercipher with different symmetric or asymmetric algorithms.

The present invention may also be applied to one way hash functions by using multiple hash outputs, where the multiple hash functions are preferably based on different functions. The present embodiment is similar to the first embodiment. Different hashing functions are applied to the same message. The results of the hashing function are sent to the recipient along with an encrypted message. If a third party breaks one or two of the hashing functions, it will not affect the validity of the remaining hashing functions. The recipient verifies the authenticity of all of the hashing functions. If the third party has interfered with the transmission without breaking all of the hashing functions, then all of the hashing function will not be verified. Therefore, the recipient will be aware the third party has attempted to interfere with the transmission.

Such methods as described above typically find use in e-commerce transactions involving large monetary transactions where the authenticity of the signatory is critical.

A further embodiment of the invention provides for a computer system programmed in accordance with the methods described herein.

Furthermore, an embodiment of the invention provides for a data carrier such as a computer disk, CD-ROM, and the like, carrying computer code for implementing the methods described herein.

A further embodiment of the invention provides for a virtual environment, such as an applet, for implementing the methods described herein.

Although the invention has been described with reference to certain specific embodiments, various modifications thereof will be apparent to those skilled in the art without departing from the spirit and scope of the invention as outlined in the claims appended hereto.

The invention claimed is:

1. A method for communicating information, in a data communication system, between at least a first correspondent and a second correspondent interconnected through a data communication channel therebetween, said method comprising the steps of:
   a) selecting a plurality of cryptographic algorithms known to said first correspondent and second correspondent;
   b) said first correspondent applying each of said selected cryptographic algorithms to the same information in a common message in a predetermined manner for producing for that algorithm a corresponding set of processed information;
   c) said first correspondent transmitting said sets of processed information to said second correspondent; and
   d) said second correspondent applying complementary operations of each of said selected cryptographic algorithms in accordance with said predetermined manner to respective ones of said sets of processed information for deriving, from each of said sets of processed information, information related to said common message.

2. The method according to claim 1 wherein said cryptographic algorithms are public key digital signature schemes and said complementary operations perform respective verifications of respective digital signatures.

3. The method according to claim 1 wherein the results of said complementary operations are compared to provide an indication of the authenticity of said sets of processed information.

4. The method according to claim 1, wherein said cryptographic algorithms are hashing functions.

5. The method according to claim 1 wherein said information related to said common message is identically equal to said common message.

6. The method according to claim 1, wherein said information related to said common message is a mathematical representation of said common message.

7. The method according to claim 1 wherein said cryptographic algorithms are digital signature schemes, and wherein said sets of processed information include at least two independently generated digital signatures of said common message.

8. The method according to claim 7 wherein said second correspondent verifies each of said digital signatures.

9. A method of preparing information to be communicated between a first correspondent and a second correspondent over a data communication channel, said method comprising the steps of:
- a) selecting a plurality of cryptographic algorithms known to said first correspondent and second correspondent;
- b) said first correspondent applying each of said selected cryptographic algorithms to the same information in a common message in a predetermined manner to produce, for that algorithm, a corresponding set of processed information; and
- c) said first correspondent transmitting said sets of processed information to said second correspondent.

10. The method according to claim 9 wherein said cryptographic algorithms are digital signature schemes, and wherein said sets of processed information include at least a pair of signatures.

11. A method of verifying the authenticity of a plurality of sets of processed information sent by a first correspondent over a data communication channel to a second correspondent, each set of processed information having been obtained by applying respective one of a plurality of cryptographic algorithms in a predetermined manner to the same information in a common message, said method comprising the steps of:
receiving said plurality of sets of processed information; and
for each set of processed information of said plurality of sets of processed information, applying complementary operations of a respective one of said plurality of cryptographic algorithms to that set of processed information in accordance with said predetermined manner to verify the authenticity of that set of processed information.

12. The method according to claim 11 wherein said cryptographic algorithms are digital signature schemes applied to said common message to obtain corresponding digital signatures, and wherein said verifying the authenticity of said sets of processed information includes verifying each of said digital signatures.

13. A data communication system comprising:
a first cryptographic unit;
a second cryptographic unit; and
a data communication channel therebetween,
wherein:
each of said cryptographic units stores a common plurality of cryptographic algorithms;
said first cryptographic unit is configured for:
selecting two or more of said plurality of cryptographic algorithms,
applying each of said selected algorithms to the same information in a common message in a predetermined manner for producing for that algorithm a corresponding set of processed information; and
transmitting said of processed information to said second cryptographic unit; and
said second cryptographic unit is configured for applying complementary operations of each of said selected cryptographic algorithms in accordance with said predetermined manner to respective ones of said sets of processed information for deriving, from each of said sets of processed information, information related to said common message.

14. The system according to claim 13 wherein said cryptographic algorithms are digital signature schemes.

15. The system according to claim 14 wherein said first cryptographic unit operates to produce a respective digital signature on said common message with each of said cryptographic algorithms such that a plurality of digital signatures is produced.

16. A cryptographic unit for preparing information to be communicated between a first correspondent and a second correspondent over a data communication channel, said cryptographic unit being configured for:
selecting plurality of cryptographic algorithms known to said first correspondent and said second correspondent;
applying each of said selected cryptographic algorithms to the same information in a common message in a predetermined manner for producing for that algorithm a corresponding set of processed information; and
transmitting said sets of processed information to said second correspondent.

17. The cryptographic unit according to claim 16 wherein said cryptographic algorithms are digital signature schemes and said sets of processed information include at least a pair of digital signatures.

18. A cryptographic unit for verifying the authenticity of a plurality of sets of processed information sent by a first correspondent over a data communication channel, each set of processed information having been obtained by applying a respective one of a plurality of cryptographic algorithms in a predetermined manner to the same information in a common message, said cryptographic unit being configured for:
receiving said plurality of sets of processed information; and
for each set of processed information of said plurality of sets of processed information, applying complementary operations of a respective one of said plurality of cryptographic algorithms to that set of processed information in accordance with said predetermined manner to verify the authenticity of that set of processed information.

19. The cryptographic unit according to claim 18 wherein said cryptographic algorithms are digital signature schemes applied to said common message to obtain corresponding digital signatures, and wherein said method further comprises the step of verifying each of said digital signatures.

* * * * *

UNITED STATES PATENT AND TRADEMARK OFFICE
CERTIFICATE OF CORRECTION

PATENT NO. : 7,797,539 B2  
APPLICATION NO. : 09/907935  
DATED : September 14, 2010  
INVENTOR(S) : Johnson et al.

Page 1 of 1

It is certified that error appears in the above-identified patent and that said Letters Patent is hereby corrected as shown below:

On the Title Page, item [73], should read as

--Assignee: Certicom Corp., Mississauga, Ontario (CA)--

Signed and Sealed this  
First Day of July, 2014

Michelle K. Lee  
*Deputy Director of the United States Patent and Trademark Office*